(12) United States Patent
Ikemiya et al.

(10) Patent No.: US 9,358,917 B2
(45) Date of Patent: Jun. 7, 2016

(54) TRANSPORT REFRIGERATION SYSTEM

(75) Inventors: Makoto Ikemiya, Osaka (JP); Hisaaki Takaoka, Osaka (JP)

(73) Assignee: DAIKIN INDUSTRIES, LTD., Osaka-Shi (JP)

(*) Notice: Subject to any disclaimer, the term of this patent is extended or adjusted under 35 U.S.C. 154(b) by 1027 days.

(21) Appl. No.: 13/377,181

(22) PCT Filed: Jun. 7, 2010

(86) PCT No.: PCT/JP2010/003787
§ 371 (c)(1),
(2), (4) Date: Dec. 9, 2011

(87) PCT Pub. No.: WO2010/143407
PCT Pub. Date: Dec. 16, 2010

(65) Prior Publication Data
US 2012/0079843 A1 Apr. 5, 2012

(30) Foreign Application Priority Data
Jun. 10, 2009 (JP) .................. 2009-139356

(51) Int. Cl.
*F25B 13/00* (2006.01)
*B60K 11/02* (2006.01)
*B60P 3/20* (2006.01)

(52) U.S. Cl.
CPC ..................... *B60P 3/20* (2013.01)

(58) Field of Classification Search
CPC ........ F25B 27/02; F25B 29/003; F25B 30/06; F02B 41/10; F02B 37/005; F02B 37/02; F02B 41/06; F02B 2075/025; F02B 41/08; F02B 1/00; F02B 2700/026; F02B 53/00; F02B 3/06; F04B 35/00; F01D 9/026; F01D 17/143

USPC ............ 60/614–624; 62/186, 98, 238.6, 239, 62/244, 259.2
See application file for complete search history.

(56) References Cited

U.S. PATENT DOCUMENTS

| | | | | |
|---|---|---|---|---|
| 6,575,258 B1* | 6/2003 | Clemmer | ............... | B60K 11/02 165/41 |
| 7,434,416 B2* | 10/2008 | Iritani | ................... | F25B 31/006 62/180 |
| 7,579,805 B2* | 8/2009 | Saito | .................. | H05K 7/20927 318/767 |
| 2005/0045322 A1* | 3/2005 | Yoshida | ............. | B60H 1/00785 165/202 |
| 2005/0183434 A1* | 8/2005 | Iritani | ................... | F25B 31/006 62/228.1 |
| 2006/0037352 A1* | 2/2006 | Cho | ........................ | F25B 13/00 62/323.3 |
| 2010/0000241 A1* | 1/2010 | Kitano | ............... | B60H 1/00014 62/134 |

FOREIGN PATENT DOCUMENTS

| | | |
|---|---|---|
| EP | 1 512 565 A1 | 3/2005 |
| JP | 5-38933 A | 2/1993 |
| JP | 5-24691 U | 3/1993 |

(Continued)

*Primary Examiner* — Frantz Jules
*Assistant Examiner* — Meraj A Shaikh
(74) *Attorney, Agent, or Firm* — Birch, Stewart, Kolasch & Birch, LLP

(57) ABSTRACT

A refrigeration system for trailer includes an engine, a generator driven by the engine to generate electric power, an inverter substrate, a temperature sensor that senses a temperature of the inverter circuit, and a heat carrying mechanism that heats the inverter substrate with waste heat of the engine when a sensed temperature by the temperature sensor is an operational temperature or lower.

6 Claims, 10 Drawing Sheets

(56) References Cited

FOREIGN PATENT DOCUMENTS

| JP | H0524691 | U | * | 3/1993 |
| JP | H0524691 | U | * | 3/1993 |
| JP | 2001-163038 | A | | 6/2001 |
| JP | 2005-83640 | A | | 3/2005 |
| JP | 2007-112357 | A | | 5/2007 |
| JP | 2007-202244 | A | | 8/2007 |
| JP | 2007202244 | A | * | 8/2007 |

* cited by examiner

TRANSPORT REFRIGERATION SYSTEM

TECHNICAL FIELD

The present disclosure relates to refrigeration systems, and particularly relates to transport refrigeration systems used at low outside air temperatures.

BACKGROUND ART

Conventional refrigerator vehicles for overland transport of goods such as frozen foods while keeping those at low temperatures have been known. In such a refrigerator vehicle, for example, a refrigeration system for vehicle as disclosed in Patent Document 1 is provided. This refrigeration system includes a sub-engine separately from an engine for driving the refrigerator vehicle, and an electrically-driven compressor driven by the sub-engine. The number of revolutions of this electrically-driven compressor is controlled by an inverter circuit.

CITATION LIST

Patent Document

Patent Document 1: Japanese Laid-Open Patent Publication No. 05-038933

SUMMARY OF INVENTION

Technical Problem

Inverter circuits are generally designed so as to operate in an environment at a predetermined operational temperature (for example, −20° C.) or higher, and the environment available for the inverter circuits is set to the operational temperature (−20° C.) or higher. Thus, for the conventional refrigeration systems, an inverter circuit is selected assuming that the refrigeration system is used at the operational temperature (−20° C.) for the inverter circuit or higher. However, in refrigerator vehicles that carry out overland transport to a distance, actual temperatures at which their refrigeration systems are used can be lower than the operational temperature (−20° C.) for the inverter circuit in some cases. However, provided that a usage environment for a refrigeration system is assumed in view of such a case, it is necessary to select an inverter circuit at an operational temperature lower than −20° C. (for example, −30° C.), which poses a problem of high cost of the inverter circuit itself. To such a problem, measures for preheating the inverter circuit up to a temperature at which the inverter circuit is operable (−20° C. or higher in the inverter circuit described above) when an inverter circuit is used at an operational temperature or lower may be devised. However, in this case, it is necessary to separately have a preheating system or the like in order to preheat the inverter circuit. Accordingly, a problem of a rise in cost of manufacturing the refrigeration system arises.

Under these circumstances, the present disclosure has been made. It is therefore an object of the present disclosure to operate an inverter circuit in an environment at a temperature lower than an operational temperature while suppressing the rise in cost of manufacturing the refrigeration system.

Solution to the Problem

According to the present disclosure, an inverter circuit (71) is heated with waste heat of an engine (41).

A first aspect of the present disclosure is directed to a transport refrigeration system including: an engine (41); a generator (40); an inverter circuit (71); a refrigerant circuit (21); a temperature sensor (74); and a heating mechanism (60). The generator (40) is driven by the engine (41) to generate electric power. The refrigerant circuit (21) is driven by electric power generation by the generator (40). The temperature sensor (74) senses a temperature of the inverter circuit (71). The heating mechanism (60) heats the inverter circuit (71) with waste heat of the engine (41) when a sensed temperature by the temperature sensor (74) is a predetermined temperature or lower.

In the first aspect of the present disclosure, the generator (40) is driven by the engine (41) to generate electric power. The refrigerant circuit (21) is driven by electric power generated by the generator (40). At this time, the temperature sensor (74) senses a temperature of the inverter circuit (71). The heating mechanism (60) heats the inverter circuit (71) with waste heat of the engine (41) when a sensed temperature by the temperature sensor (74) is a predetermined temperature or lower.

In a second aspect of the present disclosure, in the transport refrigeration system according to the first aspect, the engine (41) includes a heat radiator (45) that cools the engine (41), and the heating mechanism (60) heats the inverter circuit (71) with waste heat of the heat radiator (45).

In the second aspect of the present disclosure, the temperature sensor (74) senses a temperature of the inverter circuit (71). The heating mechanism (60) heats the inverter circuit (71) with waste heat of the heat radiator (45) when a sensed temperature by the temperature sensor (74) is a predetermined temperature or lower.

In a third aspect of the present disclosure, in the transport refrigeration system according to the first aspect or the second aspect, the heating mechanism (60) includes an air supply channel (61) for supplying air heated with waste heat of the engine (41) to the inverter circuit (71).

In the third aspect of the present disclosure, the temperature sensor (74) senses a temperature of the inverter circuit (71). The heating mechanism (60) introduces air heated with waste heat of the engine (41) or the heat radiator (45) into the air supply channel (61) to supply the air to the inverter circuit (71) when a sensed temperature by the temperature sensor (74) is a predetermined temperature or lower.

In a fourth aspect of the present disclosure, in the transport refrigeration system according to the third aspect, the air supply channel (61) includes an air regulating mechanism (62) that regulates an amount of air to be supplied to the inverter circuit (71) on the basis of a sensed temperature by the temperature sensor (74).

In the fourth aspect of the present disclosure, the temperature sensor (74) senses a temperature of the inverter circuit (71). The heating mechanism (60) introduces air heated with waste heat of the engine (41) or the heat radiator (45) into the air supply channel (61) to supply the air to the inverter circuit (71) when a sensed temperature by the temperature sensor (74) is a predetermined temperature or lower. At this time, the air regulating mechanism (62) regulates an amount of air to be supplied from the air supply channel (61) to the inverter circuit (71) on the basis of a sensed temperature by the temperature sensor (74).

In a fifth aspect of the present disclosure, in the transport refrigeration system according to the second aspect, the heating mechanism (60) is configured to heat the inverter circuit (71) with a heat exchange fluid of the heat radiator (45).

In the fifth aspect of the present disclosure, the temperature sensor (74) senses a temperature of the inverter circuit (71).

The heating mechanism (60) heats the inverter circuit (71) with the heat exchange fluid of the heat radiator (45) when a sensed temperature by the temperature sensor (74) is a predetermined temperature or lower.

In a sixth aspect of the present disclosure, in the transport refrigeration system according to the fifth aspect, the heating mechanism (60) includes a fluid supply channel (65) which introduces the heat exchange fluid of the heat radiator (45) into a heat sink member (72) of the inverter circuit (71) to subject the heat exchange fluid and the heat sink member (72) to heat exchange.

In the sixth aspect of the present disclosure, the temperature sensor (74) senses a temperature of the inverter circuit (71). The heating mechanism (60) introduces the heat exchange fluid of the heat radiator (45) into the fluid supply channel (65) to guide the heat exchange fluid to the heat sink member (72) of the inverter circuit (71) when a sensed temperature by the temperature sensor (74) is a predetermined temperature or lower. Then, the heating mechanism (60) subjects the heat exchange fluid and the heat sink member (72) to heat exchange, to heat the inverter circuit (71).

In a seventh aspect of the present disclosure, in the transport refrigeration system according to the sixth aspect, the fluid supply channel (65) includes a fluid regulating mechanism (66) that regulates a flow rate of the heat exchange fluid passing through the fluid supply channel (65) on the basis of a sensed temperature by the temperature sensor (74).

In the seventh aspect of the present disclosure, the temperature sensor (74) senses a temperature of the inverter circuit (71). The heating mechanism (60) introduces the heat exchange fluid of the heat radiator (45) into the fluid supply channel (65) to guide the heat exchange fluid to the heat sink member (72) of the inverter circuit (71) when a sensed temperature by the temperature sensor (74) is a predetermined temperature or lower. Then, the fluid regulating mechanism (66) regulates a flow rate of the heat exchange fluid passing through the fluid supply channel (65) on the basis of a sensed temperature of the inverter circuit (71) sensed by the temperature sensor (74). The heating mechanism (60) subjects the heat exchange fluid and the heat sink member (72) to heat exchange, to heat the inverter circuit (71).

Advantages of the Invention

According to the first aspect of the present disclosure, the temperature sensor (74) and the heating mechanism (60) are provided, and thus the inverter circuit (71) can be heated by utilizing waste heat of the engine (41) when the inverter circuit (71) is at a predetermined temperature or lower. Accordingly, the inverter circuit (71) can be operated with no rise in cost of manufacturing the inverter circuit (71) itself. Further, waste heat of the engine (41) is utilized, and thus it is possible to increase a temperature of the inverter circuit (71) to the predetermined temperature or higher without separately providing a heating system or the like in order to heat the inverter circuit (71). As a result, while suppressing the rise in cost of manufacturing the refrigeration system, the inverter circuit (71) can be operated in an environment at the predetermined temperature or lower.

According to the second aspect of the present disclosure, the inverter circuit (71) is heated with waste heat of the heat radiator (45) of the engine (41), and thus it is possible to increase a temperature of the inverter circuit (71) to the predetermined temperature or higher without separately providing a heating system or the like in order to heat the inverter circuit (71). As a result, while suppressing the rise in cost of manufacturing the refrigeration system, the inverter circuit (71) can be operated in an environment at the predetermined temperature or lower.

According to the third aspect of the present disclosure, the air supply channel (61) is provided, and thus the air warmed with waste heat of the engine (41) can be supplied to the inverter circuit (71). Accordingly, it is possible to increase a temperature of the inverter circuit (71) to the predetermined temperature or higher without separately providing a heating system or the like in order to heat the inverter circuit (71). As a result, while suppressing the rise in cost of manufacturing the refrigeration system, the inverter circuit (71) can be operated in an environment at the predetermined temperature or lower.

According to the fourth aspect of the present disclosure, the air supply channel (61) is provided with the air regulating mechanism (62), and thus an amount of air to be supplied to the inverter circuit (71) can be regulated. Therefore, the air heated with waste heat of the engine (41) can be supplied to the inverter circuit (71) according to a temperature or the like of the inverter circuit (71). Accordingly, it is possible to increase a temperature of the inverter circuit (71) to the predetermined temperature or higher without separately providing a heating system or the like in order to heat the inverter circuit (71). As a result, while suppressing the rise in cost of manufacturing the refrigeration system, the inverter circuit (71) can be operated in an environment at the predetermined temperature or lower.

According to the fifth aspect of the present disclosure, the inverter circuit (71) is heated with the heat exchange fluid of the heat radiator (45), and thus the inverter circuit (71) can be heated by utilizing waste heat of the engine (41). Accordingly, it is possible to increase a temperature of the inverter circuit (71) to the predetermined temperature or higher without separately providing a heating system or the like in order to heat the inverter circuit (71). As a result, while suppressing the rise in cost of manufacturing the refrigeration system, the inverter circuit (71) can be operated in an environment at the predetermined temperature or lower.

According to the sixth aspect of the present disclosure, the fluid supply channel (65) is provided, and thus the heat exchange fluid warmed with waste heat of the engine (41) can heat the inverter circuit (71) through the heat radiator (45). Accordingly, it is possible to increase a temperature of the inverter circuit (71) to the predetermined temperature or higher without separately providing a heating system or the like in order to heat the inverter circuit (71). As a result, while suppressing the rise in cost of manufacturing the refrigeration system, the inverter circuit (71) can be operated in an environment at the predetermined temperature or lower.

According to the seventh aspect of the present disclosure, the fluid supply channel (65) is provided with the fluid regulating mechanism (66), and thus the heat exchange fluid of the heat radiator (45) can be supplied to the inverter circuit (71) according to a temperature of the inverter circuit (71). Accordingly, it is possible to increase a temperature of the inverter circuit (71) to the predetermined temperature or higher without separately providing a heating system or the like in order to heat the inverter circuit (71). As a result, while suppressing the rise in cost of manufacturing the refrigeration system, the inverter circuit (71) can be operated in an environment at the predetermined temperature or lower.

DESCRIPTION OF EMBODIMENTS

Embodiments of the present disclosure will be specifically described hereinafter with reference to the drawings.

Embodiment 1

Figure 1:
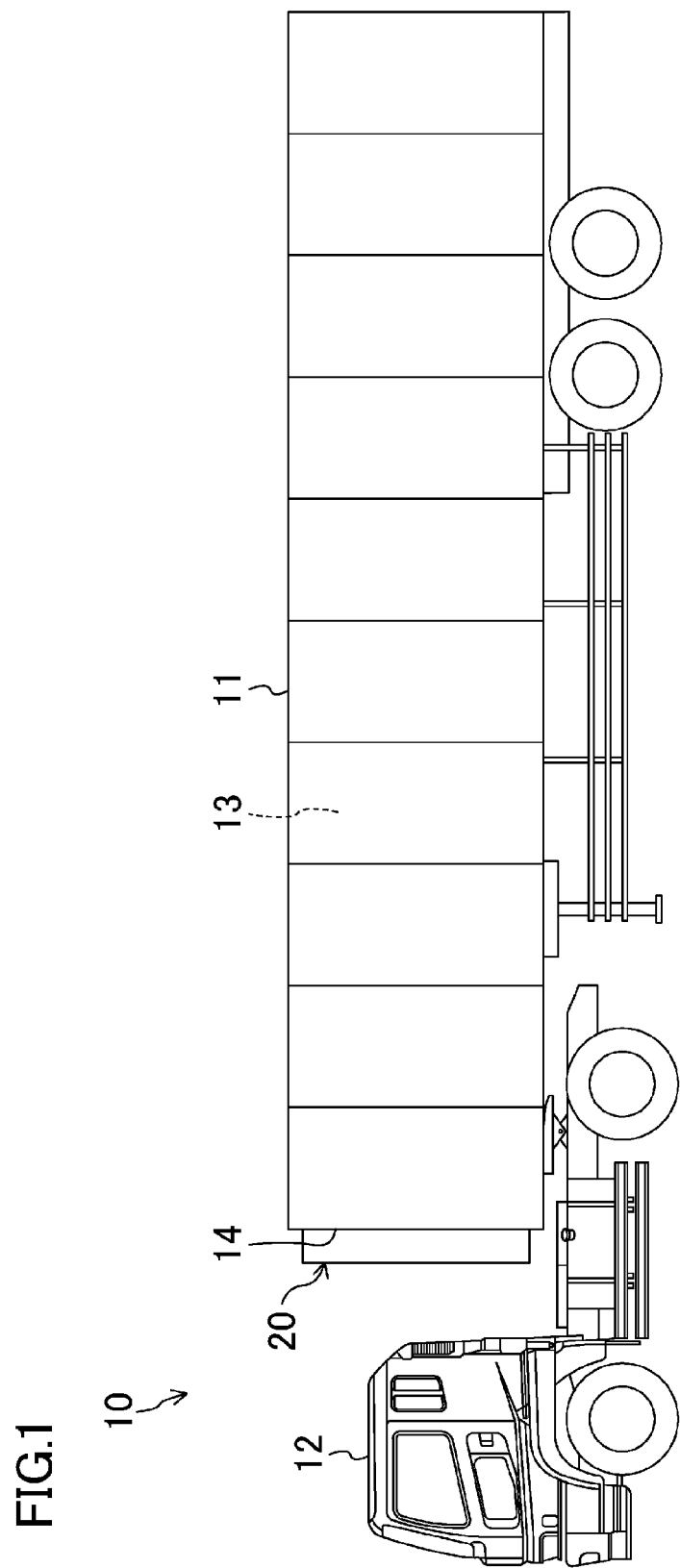
FIG. 1 is a schematic side view illustrating a refrigerator vehicle according to first and second embodiments.

As illustrated in FIG. 1, in a first embodiment, a refrigeration system (20) for trailer is loaded on a refrigerator vehicle (10) for overland transport of frozen foods, fresh foods, and the like. The refrigerator vehicle (10) has a trailer (11) in which goods such as frozen foods are stored, and a tractor (12) that tows the trailer (11).

Figure 3:
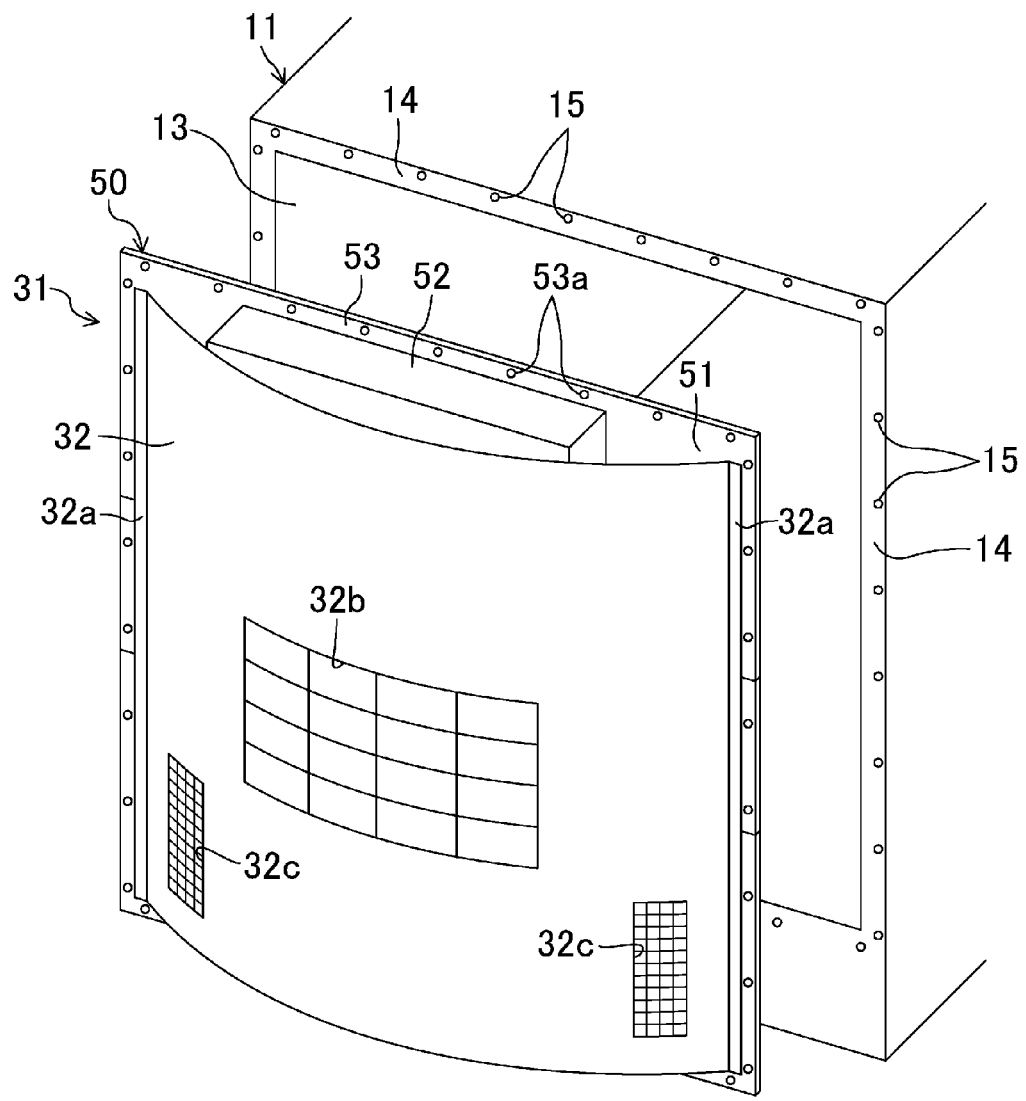
FIG. 3 is a perspective view illustrating a disassembled state of a refrigeration system for trailer according to the first and second embodiments.
Figure 4:
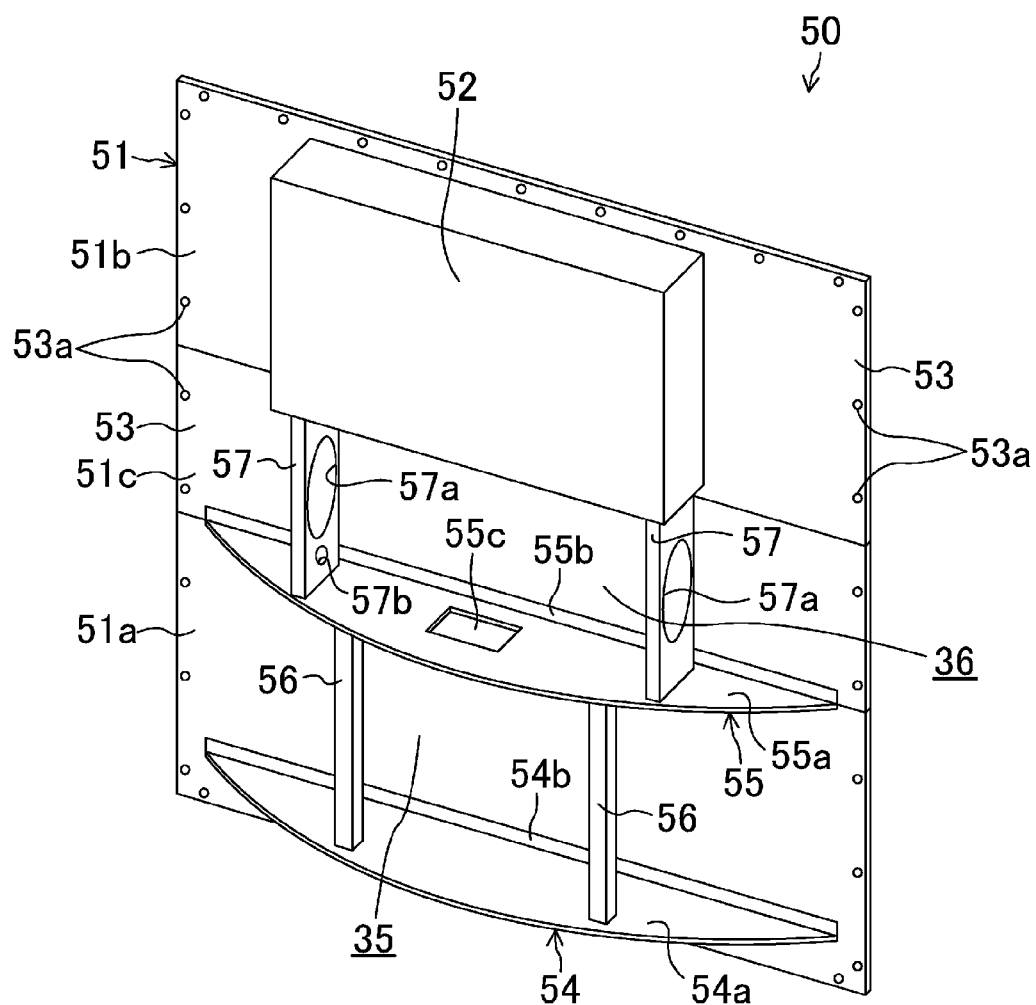
FIG. 4 is a perspective view illustrating an outdoor casing according to the first embodiment.

The trailer (11) is formed into a box shape which is an anteroposteriorly long rectangular parallelepiped shape and whose anterior end is open. An indoor space (13) is formed inside the trailer (11), and frozen foods, fresh foods, and the like are stored in the indoor space (13). As illustrated in FIG. 3, a rectangular frame shaped open part (14) is formed at the anterior end of the trailer (11). A plurality of screw clamp parts (15, 15, and . . . ) for attaching the refrigeration system (20) for trailer thereto are formed in the anterior end face of the open part (14). Eight of the plurality of screw clamp parts (15, 15, and . . . ) are arranged at regular intervals, for example, on each of the four sides of the open part (14).

Configuration of the Refrigeration System for Trailer

Figure 2:
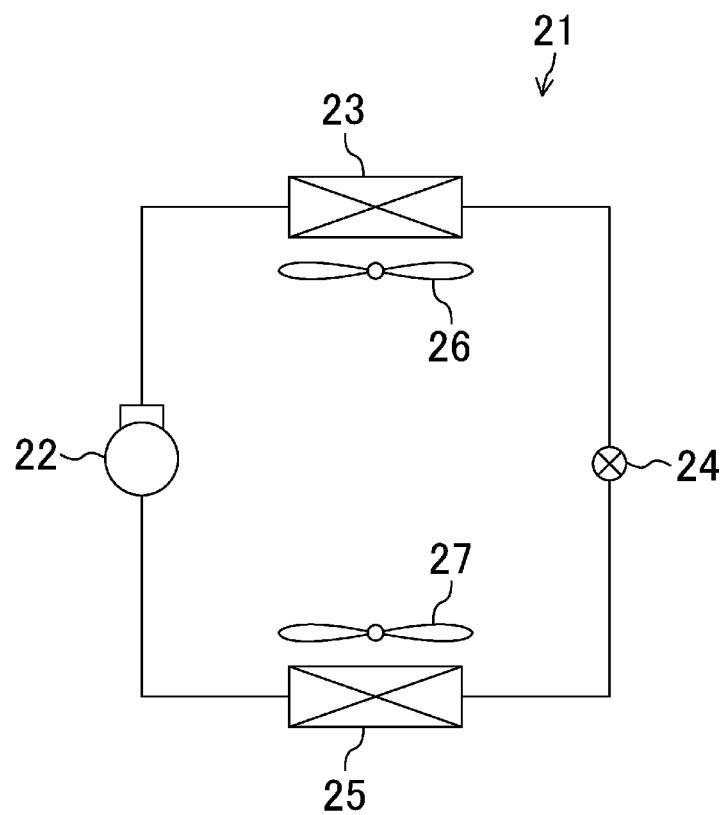
FIG. 2 is a schematic piping system diagram illustrating a refrigerant circuit according to the first and second embodiments.

The refrigeration system (20) for trailer constitutes a cooling system for cooling air in the indoor space (13) of the refrigerator vehicle (10). As illustrated in FIG. 2, the refrigeration system (20) for trailer includes a refrigerant circuit (21) filled with refrigerant. A compressor (22), a condenser (23), an expansion valve (24), and an evaporator (25) are connected to the refrigerant circuit (21). In the refrigerant circuit (21), a vapor compression refrigeration cycle is performed by circulating the refrigerant. An outdoor fan (26) is provided in the vicinity of the condenser (23). In the condenser (23), heat exchange is performed between outdoor (exterior) air carried by the outdoor fan (26) and the refrigerant. An indoor fan (27) is provided in the vicinity of the evaporator (25). In the evaporator (25), heat exchange is performed between indoor air carried by the indoor fan (27) and the refrigerant. The evaporator (25) constitutes a cooling unit for cooling the air in the indoor space (13) of the trailer (11).

As illustrated in FIGS. 3 to 7, the refrigeration system (20) for trailer has a casing unit (31) attachable to the open part (14) of the trailer (11). The casing unit (31) has a front cover (32), an outdoor casing (50), and an indoor casing (33).

Front Cover

The front cover (32) is configured to be freely attachable and detachable to and from the front face of the outdoor casing (50). The front cover (32) is composed of an arched plate-like member whose intermediate portion in the width direction (in the horizontal direction in FIG. 3) swells out forward. The front cover (32) is held at lateral side parts (32a, 32a) on both ends in the width direction by the outdoor casing (50). Accordingly, forming machine rooms (35, 36) in which various constituent machines (the details thereof will be described later) are contained, are formed between the back face of the front cover (32) and the front face of the outdoor casing (50).

Further, one central introducing port (32b) and two side introducing ports (32c, 32c) are provided in the front cover (32). The central introducing port (32b) is formed in substantially the center of the front cover (32). The side introducing ports (32c, 32c) are formed near the bottom and the right and left ends, respectively, of the front cover (32).

Outdoor Easing

The outdoor casing (50) is provided on the outer side of the trailer (11). The outdoor casing (50) is composed of an aluminum material. The outdoor casing (50) has a quadrate plate-like base part (51) and a swelling-out part (52) formed at the upper portion of the base part (51) (see FIGS. 3, 4, and 7).

The base part (51) is composed of three split bodies (51a, 51b, 51c), which are connected in the vertical direction. That is, the base part (51) is composed of the lower base part (51a) on the lower side, the upper base part (51b) on the upper base, and the intermediate base part (51c) located between the lower base part (51a) and the upper base part (51b).

A plurality of bolt holes (53a, 53a, and . . . ) through which bolts (16) are inserted are formed in an outer edge part (53) of the base part (51). Eight of the plurality of bolt holes (53a, 53a, and . . . ) are arranged at regular intervals, for example, on each of the four sides of the outer edge part (53) of the base part (51). The outdoor casing (50) is fixed to the trailer (11) when the bolts (16) penetrating the bolt holes (53a) are fastened to the screw clamp parts (15) in a state in which the outer edge part (53) of the base part (51) and the open part (14) of the trailer (11) are in closely-contact with each other.

In a state in which the outdoor casing (50) is fixed to the trailer (11), the open part (14) of the trailer (11) is blocked with the outdoor casing (50). That is, the outdoor casing (50) functions as a blocking member for the open part (14) of the trailer (11). Further, in a state in which the outdoor casing (50) is fixed to the trailer (11), the open part (14) of the trailer (11) is reinforced with the outer edge part (53) of the outdoor casing (50). That is, the outdoor casing (50) functions as a reinforcing member as well for the open part (14) of the trailer (11).

The swelling-out part (52) is composed of an aluminum material integral with the base part (51), and swells out forward from the base part (51). The swelling-out part (52) is formed into a box shape which is an anteroposteriorly flat rectangular parallelepiped shape and whose rear side opens (see FIG. 7). The swelling-out part (52) may be composed of, for example, a resin material, and may be integrally coupled to the base part (51).

The outdoor casing (50) includes a lower plate (54) and an upper plate (55). The lower plate (54) is provided near the bottom end of the base part (51), and the upper plate (55) is provided at an vertically intermediate part of the base part (51) (between the lower plate (54) and the swelling-out part (52)). The respective plates (54, 55) have arched support plate parts (54a, 55a). The support plate parts (54a, 55a) are formed into circular arc shapes in their front sides, and formed linearly in their rear sides so as to be along the front face of the base part (51). The respective plates (54, 55) have bending parts (54b, 55b) bending upward from the posterior ends of the support plate parts (54a, 55a). The bending parts (54b, 55b) are formed to be plate-like extending in the horizontal direction. The respective plates (54, 55) are fixed to the base part (51) when the bending parts (54b, 55b) are fastened to the base part (51) with rivets. Further, a communicating port (55c) is provided in the intermediate portion in the horizontal direction of the support plate part (55a) of the upper plate (55).

In the above-described state in which the front cover (32) is attached to the outdoor casing (50), the first machine room (35) is partitioned between the lower plate (54) and the upper plate (55). Further, the second machine room (36) is partitioned above the upper plate (55). The first machine room (35) and the second machine room (36) are communicated with each other through the communicating port (55c) in the upper plate (55). Further, the first machine room (35) communicates with the two side introducing ports (32c, 32c) described above, and the second machine room (36) communicates with the central introducing port (32b) described above.

The outdoor casing (50) includes two pillar parts (56) and two vertical plates (57).

The above-described pillar parts (56) are provided between the lower plate (54) and the upper plate (55). The pillar part (56) is composed of an aluminum material, and is formed into a prismatic shape extending up and down.

The above-described vertical plates (57) are provided between the upper plate (55) and the swelling-out part (52). The vertical plate (57) is composed of an aluminum material, and is formed into a substantially rectangular flat plate whose longer sides are formed along the vertical direction. A circular fan opening portion (57a) is formed in the central portion of each of the vertical plates (57, 57). Further, a duct opening portion (57b) to which an air duct (61) for supplying air to the inverter substrate (71) which will be described later is connected is formed in the vertical plate (57) on the left side when viewed from the front. The outdoor fans (26) are respectively attached to the respective fan opening portions (57a, 57a). The outdoor fan (26) is constituted by a so-called propeller fan, and its axis of rotation extends in the horizontal direction. A propeller is coupled to an edge part near the side of the compressor (22) of the axis of rotation of the outdoor fan (26), and a motor is coupled to the other end part on the opposite side. That is, the two outdoor fans (26, 26) are disposed near both of the right and left ends of the upper plate (55) so as to sandwich the two compressors (22).

Figure 5:
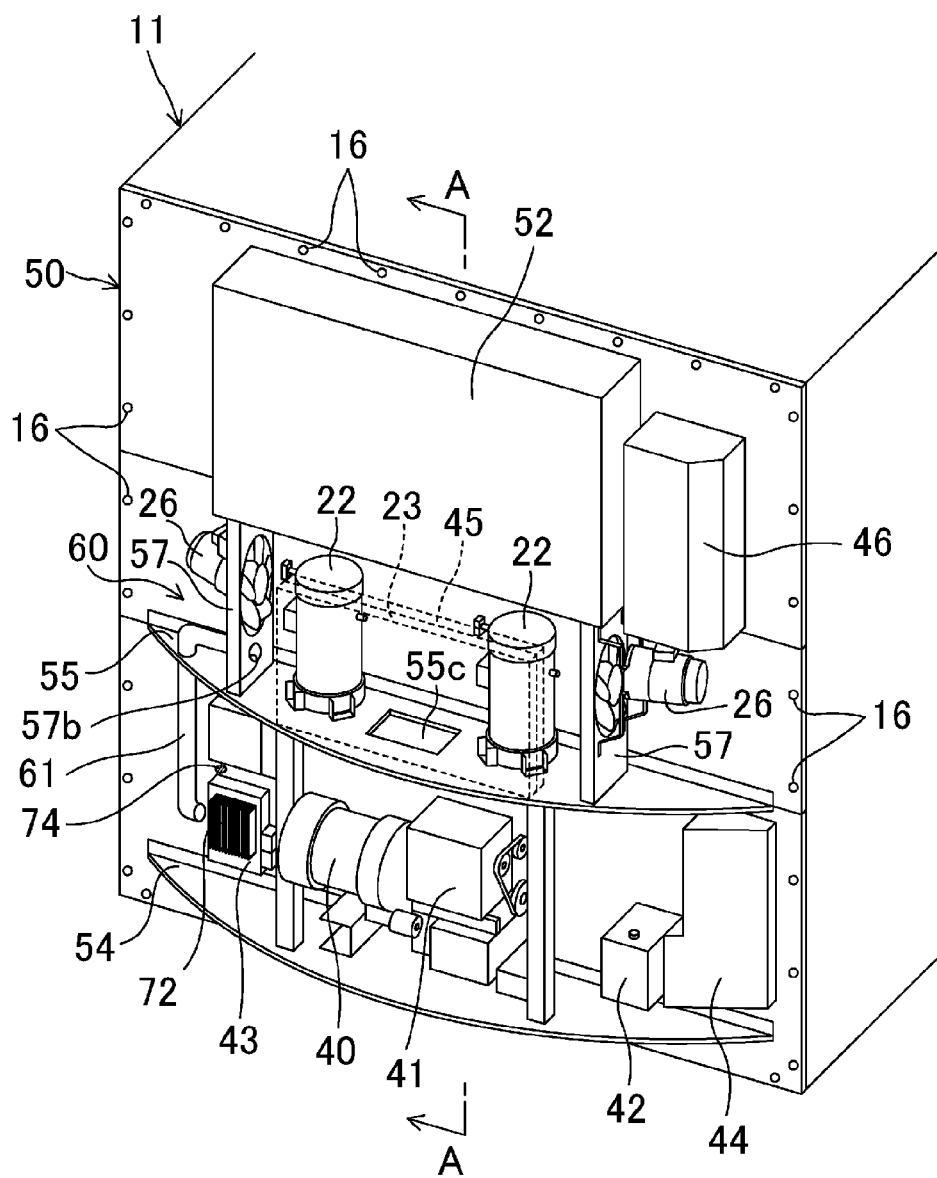
FIG. 5 is a perspective view illustrating the refrigeration system for trailer attached to a trailer according to the first embodiment.
Figure 6:
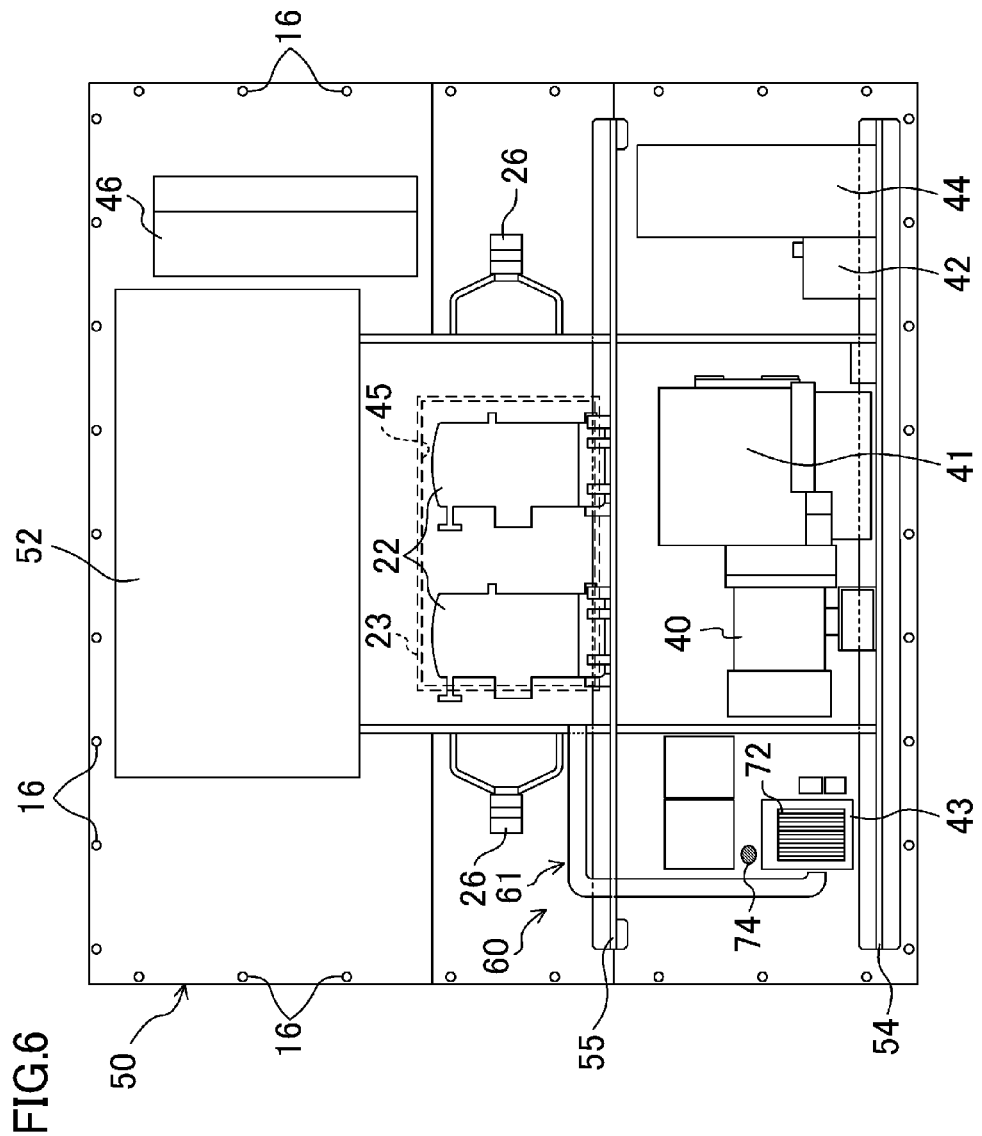
FIG. 6 is a front view illustrating the refrigeration system for trailer attached to the trailer according to the first embodiment when viewed from the front.
Figure 8:
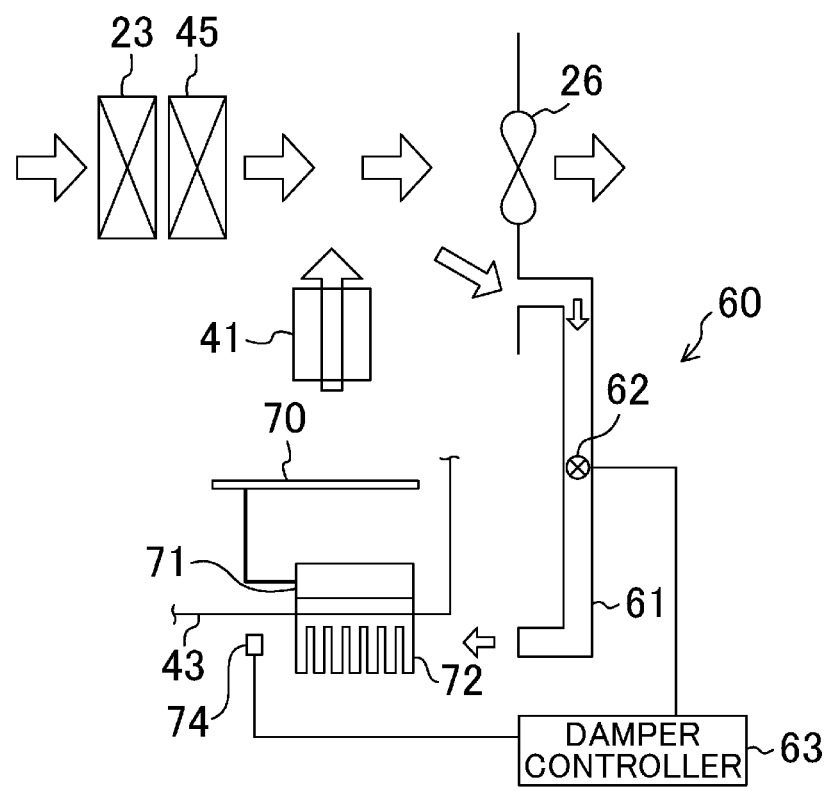
FIG. 8 is a schematic view illustrating an operating state of a heat carrying mechanism while the refrigeration system for trailer according to the first embodiment is in operation.

As illustrated in FIGS. 5 and 6, a generator (40), an engine (41), a battery (42), and a plurality of electric component boxes (43, 44) are provided in the first machine room (35) described above. Specifically, in the first machine room (35), the generator (40) and the engine (41) are installed at an intermediate position in the horizontal direction of the lower plate (54). The engine (41) is configured to drive the generator (40), and the generator (40) is configured to generate electric power for driving the compressors (22) described above and the like. Further, in the first machine room (35), the first electric component box (43), a temperature sensor (74), and a damper controller (63) are provided in a space on the left side of the generator (40), and the second electric component box (44) is provided in a space on the right side of the engine (41). As illustrated in FIG. 8, a circuit substrate (70) of the refrigeration system (20) for trailer is contained inside the above-described first electric component box (43).

The above-described circuit substrate (70) is a printed-circuit board in which circuit components are built-in, and is formed into a thin plate shape formed of a synthetic resin material or the like. A large number of various electrical parts (not shown) such as a transformer and a condenser are mounted and electrically-conducting paths (not shown) are laid down on a surface of the circuit substrate (70). Further, an inverter substrate (71) composed of an inverter element serving as an exothermic body is electrically connected to the other surface of the circuit substrate (70). The inverter substrate (71) according to the first embodiment is, for example, designed to have an operational temperature which is −20° C. or higher. Further, the "operational temperature" of the inverter substrate (71) according to the embodiment is a temperature indicating a "predetermined temperature" according to the present disclosure. In addition, a heat sink (72) formed into a substantially rectangular parallelepiped box body is attached to the inverter substrate (71). The heat sink (72) passes through the front face portion of the first electric component box (43) from the inside of the first electric component box (43) to project forward. The heat sink (72) is made of a metal material, and radiates heat generated in the inverter substrate (71) to cool down the inverter substrate (71). Further, the temperature sensor (74) is provided in the vicinity of the heat sink (72).

The above-described temperature sensor (74) is configured to sense an ambient temperature of the inverter substrate (71), and constitutes a temperature sensor according to the present disclosure. The temperature sensor (74) is located in the vicinity of the heat sink (72) outside the first electric component box (43) in the first machine room (35). Further, the temperature sensor (74) is connected to the damper controller (63) which will be described later. The temperature sensor (74) is configured to measure a temperature in the vicinity of the heat sink (72), to sense an ambient temperature of the inverter substrate (71). Temperature data of the temperature sensor (74) are transmitted to the damper controller (63) by the minute. The temperature sensor (74) may be brought into contact with the inverter substrate (71) or the inverter element (not shown) so as to directly measure a temperature thereof. Further, the temperature sensor (74) may sense an outside air temperature of the refrigeration system (20) for trailer. In addition, although not described in the first embodiment, measured temperature data of an outside air temperature sensor or the like installed for controlling a refrigeration cycle and the like may be served to substitute for sensed temperature data of the temperature sensor (74).

The two compressors (22), the condenser (23), a radiator (45), the two outdoor fans (26), a third electric component box (46), and a heat carrying mechanism (60) are provided in the second machine room (36).

Specifically, in the second machine room (36), the two compressors (22) are installed at an intermediate position in the horizontal direction of the upper plate (55). These compressors (22) are constituted as variable volume compressors (inverter compressors) whose numbers of revolutions are controlled by the inverter substrate (71). Further, the radiator (45) and the condenser (23) are disposed in front of the compressors (22). The condenser (23) is installed so as to bridge over the two vertical plates (57). The central introducing port (32b) of the front cover (32) is located in front of the condenser (23). Further, in the second machine room (36), the third electric component box (46) is provided in a space on the upper right side when viewed from the front.

The above-described radiator (45) is used for radiating heat of the engine with coolant water, and constitutes a heat radiator according to the present disclosure. The radiator (45) has a heat transfer pipe (not shown) through which the coolant water circulates, and is connected to the engine (41) through a cooling pipe (45a). The radiator (45) is disposed on the rear side of the condenser (23).

The heat carrying mechanism (60) is composed of the air duct (61), a damper (62), and the damper controller (63). The heat carrying mechanism (60) constitutes a heating mechanism according to the present disclosure.

The air duct (61) is used for supplying air in the second machine room (36) to the first machine room (35), and constitutes an air supply channel according to the present disclosure. The air duct (61) is formed into a pipe shape through which air circulates. Further, with respect to the air duct (61), its one end is connected to the duct opening portion (57b) of the vertical plate (57), and on the other hand, the other end passes through the upper plate (55) to extend to the vicinity of the first electric component box (43) in the first machine room (35). The damper (62) is provided at a position along the way of the air duct (61). The damper (62) is configured to be openable and closable, to regulate an amount of air circulating through the air duct (61). The damper (62) constitutes an air regulating mechanism according to the present disclosure. The damper controller (63) is configured to control an open or closed state of the damper (62) on the basis of sensed temperature data of the temperature sensor (74). The damper controller (63) is connected to the damper (62) and the temperature sensor (74). The damper controller (63) brings the damper (62) into a closed state when a sensed temperature transmitted from the temperature sensor (74) is −20° C. or higher, and brings the damper (62) into an open state when a temperature becomes lower than −20° C.

Indoor Casing

Figure 7:
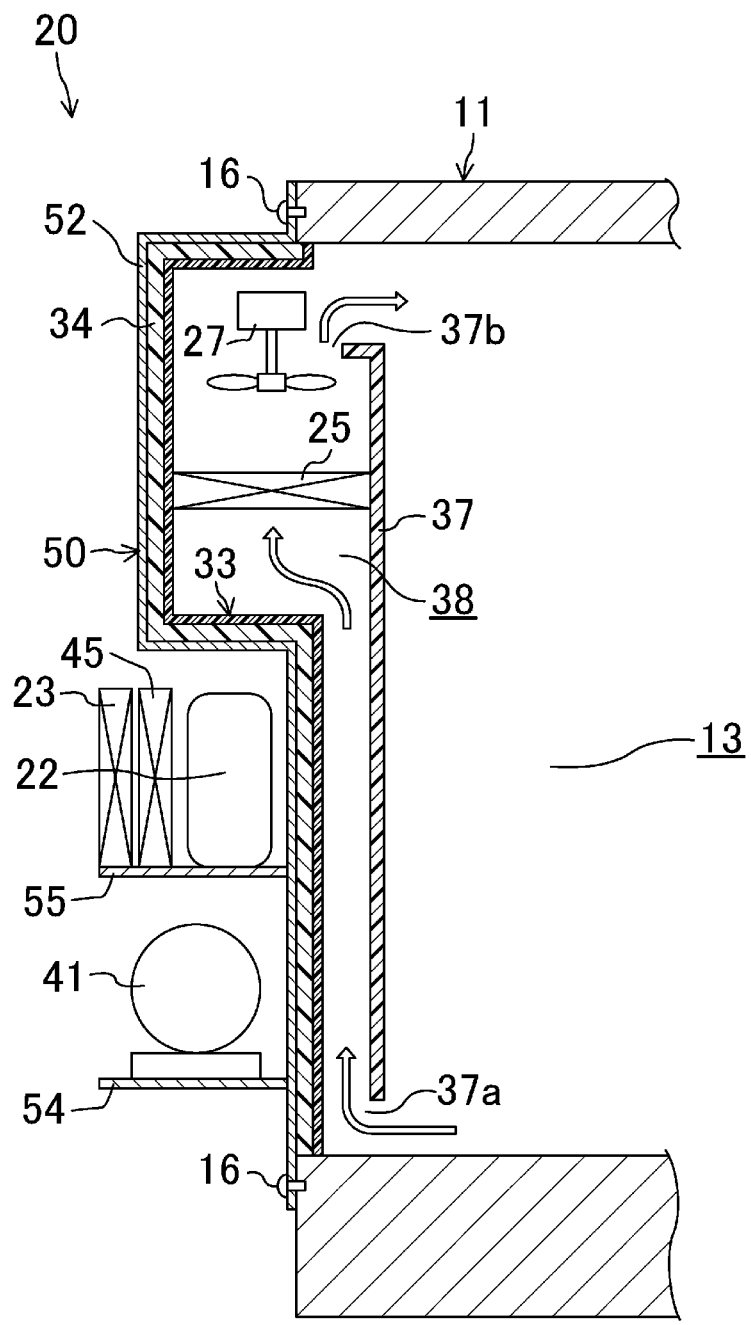
FIG. 7 is a cross-sectional view taken along a line A-A of FIG. 5.

As illustrated in FIG. 7, the indoor casing (33) is provided on the back face side of the outdoor casing (50) so as to face the indoor space (13) of the trailer (11). The indoor casing (33) is composed of, for example, a fiber-glass reinforced plastic (FRP) material. The indoor casing (33) may be composed of another resin material, metal material, or the like. The indoor casing (33) has a shape along the back face of the outdoor casing (50).

The front face of the indoor casing (33) is at a predetermined space from the back face of the outdoor casing (50), and a heat insulating member (34) is formed between the indoor casing (33) and the outdoor casing (50). The heat insulating member (34) is formed integrally with the casing unit (31) such that an enclosed space is formed between the outdoor casing (50) and the indoor casing (33), and the enclosed space is thereafter filled with resin foam.

Further, a partition member (37) is attached to the back face side of the indoor casing (33). The partition member (37) is installed so as to place given spaces respectively from the back face of the indoor casing (33), the upper inner wall of the trailer (11), and the lower inner wall of the trailer (11). Accordingly, an inflow port (37a) is formed on the lower side of the partition member (37), and an outflow port (37b) is formed on the upper side of the partition member (37). Further, an inside air flow channel (38) is formed so as to bridge over the inflow port (37a) and the outflow port (37b) between the indoor casing (33) and the partition member (37).

The evaporator (25) and the indoor fan (27) are provided in the inside air flow channel (38). The evaporator (25) is installed so as to bridge between the indoor casing (33) and the partition member (37), to be supported with the indoor casing (33) on the back face side of the swelling-out part (52). The indoor fan (27) is provided above the evaporator (25).

Operation

Figure 9:
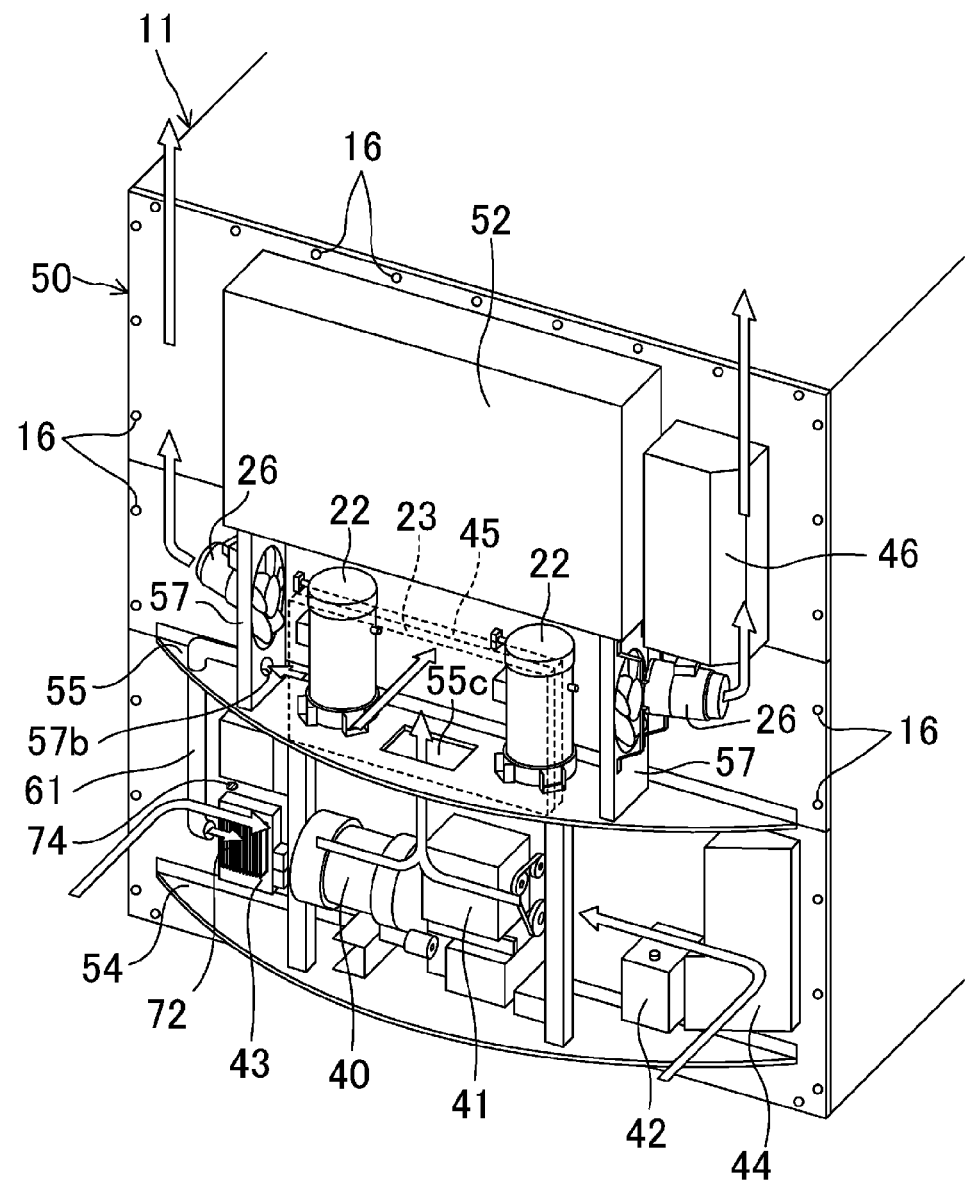
FIG. 9 is a perspective view illustrating a flow of wind inside the refrigeration system for trailer attached to the trailer according to the first embodiment.

Now, operation of the refrigeration system (20) for trailer is described with reference to FIGS. 7 and 9.

When the generator (40) is driven by the engine (41), electric power is generated in the generator (40). This electric power is supplied to the compressors (22), the outdoor fan (26), and the indoor fan (27). The compressors (22) are driven to perform a refrigeration cycle in the refrigerant circuit (21).

Specifically, the refrigerant compressed in the compressor (22) flows through the condenser (23). In the condenser (23), the refrigerant radiates heat to the outdoor air to be condensed. The condensed refrigerant passes through the swollen valve (24) to be reduced in pressure, and the refrigerant which has been reduced in pressure flows through the evaporator (25). In the evaporator (25), the refrigerant absorbs heat from the indoor air to evaporate. The evaporated refrigerant is again compressed in the compressor (22).

When the indoor fan (27) is driven, the indoor air in the indoor space (13) is sucked into the inside air flow channel (38) from the inflow port (37a). The air sucked into the inside air flow channel (38) flows upward to pass through the evaporator (25). In the evaporator (25), the indoor air is subjected to heat exchange with the refrigerant to be cooled down. The indoor air cooled in the evaporator (25) flows out of the outflow port (37b) to the indoor space (13), to be utilized for cool storage/freezer storage of goods and the like.

On the other hand, when the outdoor fan (26) is driven, the outdoor (exterior) air is sucked into the machine rooms (35, 36). Specifically, the outdoor air is sucked into the two side introducing ports (32c, 32c) and the central introducing port (32b) of the front cover (32). The air introduced into the first machine room (35) from the side introducing port (32c) on the left side of the two side introducing ports (32c, 32c) passes around the first electric component box (43), to be sent to the vicinity of the generator (40) and the engine (41). Further, the air introduced into the first machine room (35) from the side introducing port (32c) on the right side of the two side introducing ports (32c, 32c) passes around the second electric component box (44), to be sent to the vicinity of the engine (41) and the generator (40). When the air flows in the vicinity of the engine (41) and the generator (40), the engine (41) and the generator (40) are cooled by the air. The air utilized for cooling the engine (41) and the generator (40) passes upward in the communicating port (55c) to be sent to the second machine room (36).

Further, the air sucked into the second machine room (36) from the central introducing port (32b) passes through the condenser (23). In the condenser (23), the refrigerant radiates heat to the outdoor air, to be condensed. The air which has passed through the condenser (23) flows around the radiator

(45) to be utilized for cooling the radiator (45), and flows together with the air which has passed through the communicating port (55c).

The air which has flowed together in the second machine room (36) split-flows to the right and left so as to flow around the two compressors (22, 22). The air which has split-flowed to the left passes through the upper end opening of the front cover (32) to be discharged to the outside of the outdoor casing (50). The air which has split-flowed to the right passes through the third electric component box (46), and thereafter passes through the upper end opening of the front cover (32) to be discharged to the outside of the outdoor casing (50).

Heating Operation of the Inverter Substrate

Here, a heating operation of the inverter substrate (71) of the refrigeration system (20) for trailer according to the first embodiment in an environment at a low outside air temperature is described.

Usually, during operation of the refrigeration system (20) for trailer, data of ambient temperatures of the inverter substrate (71) sensed by the temperature sensor (74) are successively transmitted to the damper controller (63). When a temperature sensed by the temperature sensor (74) is −20° C. or higher, the damper controller (63) brings the damper (62) into a closed state. However, when the refrigerator vehicle (10) travels in an environment at a low outside air temperature in Northern Europe or the like (in the first embodiment, an outside air temperature lower than −20° C.), an ambient temperature of the inverter substrate (71) can be lower than −20° C. in some cases.

Figure 10:
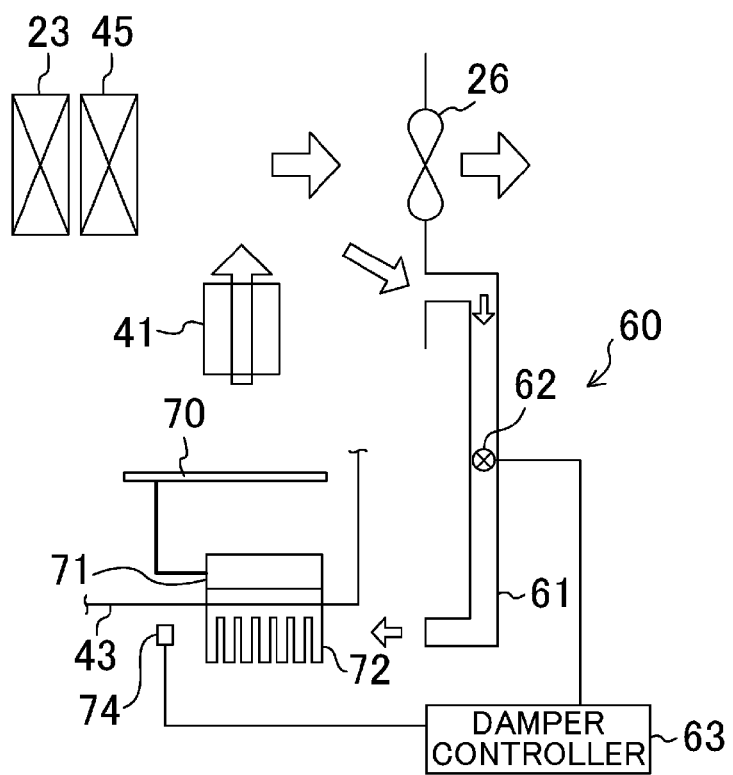
FIG. 10 is a schematic view illustrating an operating state of the heat carrying mechanism at start-up of the refrigeration system for trailer according to the first embodiment.

Specifically, as illustrated in FIG. 10, when a sensed temperature by the temperature sensor (74) is lower than −20° C. at start-up of the refrigeration system (20) for trailer, the refrigeration system (20) for trailer drives the outdoor fan (26), the engine (41), and the generator (40), and on the other hand, the damper controller (63) brings the damper (62) into an open state. The air introduced into the first machine room (35) from the side introducing ports (32c, 32c) flows in the vicinity of the engine (41), to absorb heat from the engine (41). The air in the first machine room (35) is introduced into the second machine room (36) from the communicating port (55c). The air introduced into the second machine room (36) partially flows into the air duct (61). The air in the second machine room (36) is kept at a relatively warm temperature because the air has absorbed heat from the engine (41). Then, the air which has passed through the air duct (61) is introduced into the first machine room (35). In the first machine room (35), the heat sink (72) of the first electric component box (43) is warmed with the air flowed out of the air duct (61). The inverter substrate (71) is warmed through the warmed heat sink (72). Next, when a sensed temperature by the temperature sensor (74) is raised to −20° C. or higher, the refrigeration system (20) for trailer starts a refrigeration operation. Next, when a sensed temperature by the temperature sensor (74) becomes lower than −20° C. during operation of the refrigeration system (20) for trailer, as illustrated in FIG. 8, the damper controller (63) brings the damper (62) into an open state. When the damper (62) is brought into an open state, the air in the second machine room (36) partially flows into the air duct (61). The air in the second machine room (36) is kept at a relatively warm temperature because the air whose heat has been radiated in the condenser (23) and the air which has absorbed heat in the radiator (45) are included. Then, the air which has passed through the air duct (61) is introduced into the first machine room (35). In the first machine room (35), the heat sink (72) of the first electric component box (43) is warmed with the air flowed out of the air duct (61). The inverter substrate (71) is warmed through the warmed heat sink (72). Next, when a sensed temperature by the temperature sensor (74) is raised to −20° C. or higher, the damper controller (63) closes the damper (62). When a sensed temperature by the temperature sensor (74) again becomes lower than −20° C., the damper controller (63) again opens the damper (62).

Advantages of Embodiment 1

In the first embodiment, the temperature sensor (74) and the air duct (61) are provided, and thus the inverter substrate (71) can be warmed with air heated by utilizing waste heat of the engine (41) when an ambient temperature of the inverter substrate (71) becomes lower than −20° C. Further, the heat sink (72) is attached to the inverter substrate (71), and thus the inverter substrate (71) can be warmed through the heat sink (72). The damper (62) is provided in the air duct (61), and thus the air warmed by the engine (41) or the radiator (45) can be supplied to the inverter substrate (71) according to an ambient temperature of the inverter substrate (71). Accordingly, it is possible to increase a temperature of the inverter substrate (71) to −20° C. or higher without separately providing a heating system or the like in order to heat the inverter substrate (71). As a result, while suppressing the rise in cost of manufacturing the refrigeration system (20) for trailer, the inverter substrate (71) can be operated in an environment at a temperature lower than the operational temperature of the inverter substrate (71).

Embodiment 2

Figure 11:
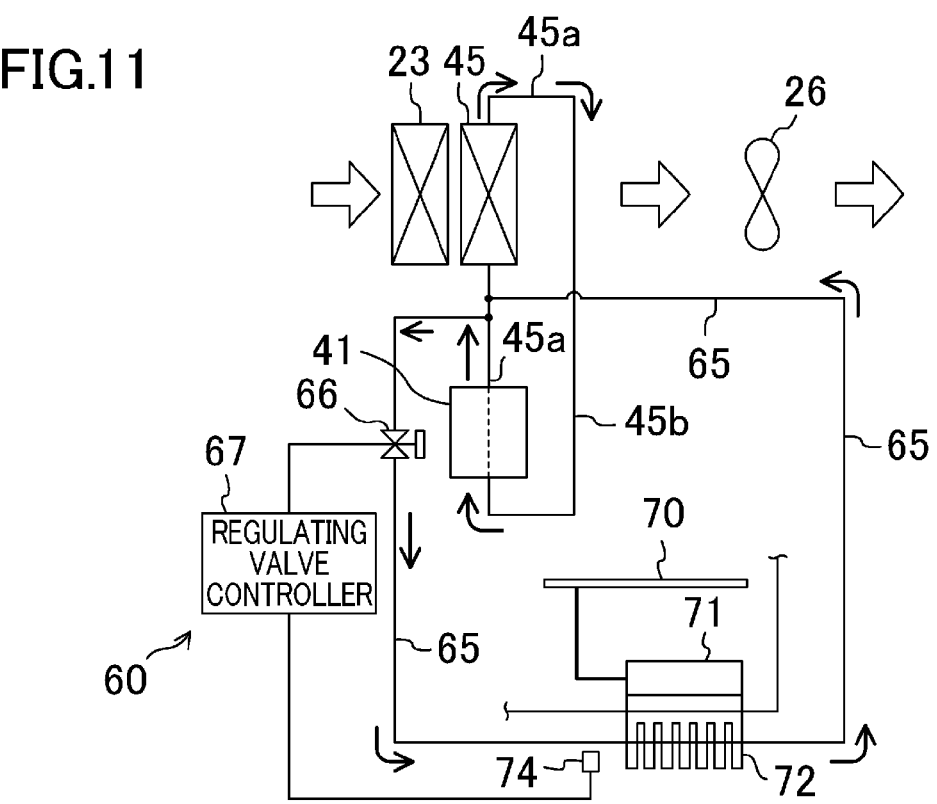
FIG. 11 is a schematic view illustrating a heat carrying mechanism according to the second embodiment.

The refrigeration system (20) for trailer according a second embodiment is, as illustrated in FIG. 11, different in configuration of the heat carrying mechanism (60) according to the first embodiment.

Specifically, the heat carrying mechanism (60) according the second embodiment includes water piping (65), a regulating valve (66), and a regulating valve controller (67).

The water piping (65) is constituted as piping formed into a pipe shape. The water piping (65) constitutes a fluid supply channel according to the present disclosure. The base end and terminal end of the water piping (65) are connected to the inflow side of coolant water of the radiator (45). That is, the coolant water which has absorbed heat from the engine (41) to be in a relatively warm state is introduced into the water piping (65). Further, a portion along the way of the water piping (65) is in contact with the heat sink (72) of the inverter substrate (71) in the first machine room (35). The above-described regulating valve (66) is constituted as an electrically-driven two-way valve which is openable and closable, and regulates a flow rate of the coolant water flowing through the water piping (65). The regulating valve (66) constitutes a flow rate regulating mechanism according to the present disclosure. The above-described regulating valve controller (67) is configured to control an open and closed state of the regulating valve (66) on the basis of a sensed temperature by the temperature sensor (74). The regulating valve controller (67) is connected to the regulating valve (66) and the temperature sensor (74). The regulating valve controller (67) brings the regulating valve (66) into a closed state when sensed temperature data transmitted from the temperature sensor (74) is −20° C. or higher, and brings the regulating valve (66) into an open state when the sensed temperature data becomes lower than −20° C.

Heating Operation of the Inverter Substrate

Now, a heating operation of the inverter substrate (71) of the refrigeration system (20) for trailer according to the second embodiment in an environment at a low outside air temperature is described.

Usually, during operation of the refrigeration system (20) for trailer, the data of ambient temperatures of the inverter substrate (71) sensed by the temperature sensor (74) are successively transmitted to the regulating valve controller (67). Then, when a temperature sensed by the temperature sensor (74) is −20° C. or higher, the regulating valve controller (67) keeps the regulating valve (66) in a closed state. Then, when a sensed temperature by the temperature sensor (74) is lower than −20° C. at start-up of the refrigeration system (20) for trailer, the refrigeration system (20) for trailer drives the outdoor fan (26), the engine (41), and the generator (40), and on the other hand, the regulating valve controller (67) brings the regulating valve (66) into an open state. The coolant water in the radiator (45) flows out of the outflow side thereof to flow in the vicinity of the engine (41), and absorbs heat from the engine (41) to again return to the inflow side of the radiator (45). At this time, when the regulating valve (66) is in an open state, the coolant water flowing through the inflow side of the radiator (45) is partially branched to the water piping (65) side. The coolant water flowing through the water piping (65) is subjected to heat exchange with the heat sink (72) of the inverter substrate (71) along the way of the flow, to radiate heat to the heat sink (72). Thereafter, the coolant water flows through the water piping (65) to again return to the inflow side of the radiator (45). In the first machine room (35), the inverter substrate (71) is warmed through the heat sink (72) with the coolant water in a relatively warm state, which flows through the water piping (65). Then, the refrigeration system (20) for trailer starts a refrigeration operation. Next, when a sensed temperature by the temperature sensor (74) becomes lower than −20° C. during operation of the refrigeration system (20) for trailer, the regulating valve controller (67) brings the regulating valve (66) into an open state. When the regulating valve (66) is in an open state, the coolant water flowing through the inflow side of the radiator (45) is partially branched to the water piping (65) side. The coolant water flowing through the water piping (65) is subjected to heat exchange with the heat sink (72) of the inverter substrate (71) along the way of the flow, to radiate heat to the heat sink (72). Thereafter, the coolant water flows through the water piping (65) to again return to the inflow side of the radiator (45). In the first machine room (35), the inverter substrate (71) is warmed through the heat sink (72) with the coolant water in a relatively warm state, which flows through the water piping (65).

Advantages of Embodiment 2

In the second embodiment, the inverter substrate (71) is heated with the coolant water in the radiator (45), and thus the inverter substrate (71) can be heated by utilizing waste heat of the coolant water in the radiator (45) which has absorbed waste heat of the engine (41). Further, the water piping (65) is provided, and thus the inverter substrate (71) can be heated through the heat sink (72) with the coolant water warmed by waste heat of the engine (41). Furthermore, the regulating valve (66) is provided in the water piping (65), and thus the coolant water in the radiator (45) can be supplied to the inverter substrate (71) side according to an ambient temperature of the inverter substrate (71). Accordingly, it is possible to increase a temperature of the inverter substrate (71) to an operational temperature or higher without separately providing a heating system or the like in order to heat the inverter substrate (71). As a result, while suppressing the rise in cost of manufacturing the refrigeration system (20) for trailer, the inverter substrate (71) can be operated in an environment at a temperature lower than the operational temperature of the inverter substrate (71). Configurations, operation, and advantages of the other components are the same as those in the first embodiment.

Other Embodiments

The foregoing embodiments 1 and 2 of the present disclosure may be changed as follows.

The refrigeration system (20) for trailer in the first and second embodiments has the engine (41) driving the generator (40), and utilizes waste heat of the engine (41). Alternatively, the present disclosure may be directed to utilization of waste hear of, for example, an engine for driving the refrigerator vehicle (10) or an engine for another usage. Further, in the first and second embodiments, the present disclosure is applied to a refrigeration system for an overland trailer. However, the present disclosure may be applied to a container refrigeration system used at sea or the like.

The foregoing embodiments are merely preferred examples in nature, and are not intended to limit the scope, applications, and use of the invention.

INDUSTRIAL APPLICABILITY

As described above, the present disclosure relates to refrigeration systems for transport, and in particular, is useful for refrigeration systems used at a low outside air temperature.

DESCRIPTION OF REFERENCE CHARACTERS 21 refrigerant circuit
40 generator
41 engine
45 radiator
60 heat carrying mechanism
61 air duct
62 damper
65 water piping
66 regulating valve
71 inverter substrate
72 heat sink
74 temperature sensor

The invention claimed is:
1. A transport refrigeration system comprising:
an engine;
a generator;
an inverter circuit;
a refrigerant circuit;
a temperature sensor; and
a heating mechanism, wherein:
the generator is driven by the engine to generate electric power,
the refrigerant circuit is driven by electric power generation by the generator,
the temperature sensor senses a temperature of the inverter circuit,
the heating mechanism supplies heat to the inverter circuit by diverting air heated with waste heat of the engine toward the inverter circuit when a sensed temperature by the temperature sensor is a predetermined temperature or lower, wherein the predetermined temperature is below freezing, and the heating mechanism includes an air supply channel for supplying the air heated with waste heat of the engine to the inverter circuit, a damper configured to be openable and closable to regulate an amount of air circulating through the air supply channel, and a damper controller, and the damper controller is communicatively connected to the temperature sensor and operably connected to the damper, the damper controller bringing the damper into a closed state when the sensed temperature from the temperature sensor is the predetermined temperature or higher, the damper controller bringing the damper into an open state when the sensed temperature from the temperature sensor is lower than the predetermined temperature.

2. The transport refrigeration system of claim 1, wherein the engine includes a heat radiator that cools the engine, and the heating mechanism heats the inverter circuit with waste heat of the heat radiator.

3. The transport refrigeration system of claim 1, wherein the air supply channel includes an air regulating mechanism that regulates an amount of air to be supplied to the inverter circuit on the basis of a sensed temperature by the temperature sensor.

4. The transport refrigeration system of claim 2, wherein the heating mechanism is configured to heat the inverter circuit with a heat exchange fluid of the heat radiator.

5. A transport refrigeration system comprising:
an engine;
a generator;
an inverter circuit;
a refrigerant circuit;
a temperature sensor; and
a heating mechanism, wherein:
the generator is driven by the engine to generate electric power, the refrigerant circuit is driven by electric power generation by the generator, the temperature sensor senses a temperature of the inverter circuit, and the heating mechanism supplies heat to the inverter circuit by diverting waste heat of the engine toward the inverter circuit when a sensed temperature by the temperature sensor is a predetermined temperature or lower, wherein the predetermined temperature is below freezing, the engine includes a heat radiator that cools the engine, the heating mechanism heats the inverter circuit with waste heat of the heat radiator, the heating mechanism is configured to heat the inverter circuit with a heat exchange fluid of the heat radiator, and the heating mechanism includes a fluid supply channel which introduces the heat exchange fluid of the heat radiator into a heat sink member of the inverter circuit to subject the heat exchange fluid and the heat sink member to heat exchange, a regulating valve configured to be openable and closable to regulate a flow rate of the heat exchange fluid flowing through the fluid supply channel, and a regulating valve controller, and the regulating valve controller is communicatively connected to the temperature sensor and operably connected to the regulating valve, the regulating valve controller bringing the regulating valve into a closed state when the sensed temperature from the temperature sensor is the predetermined temperature or higher, the regulating valve controller bringing the regulating valve into an open state when the sensed temperature from the temperature sensor is lower than the predetermined temperature.

6. The transport refrigeration system of claim 5, wherein the fluid supply channel includes a fluid regulating mechanism that regulates a flow rate of the heat exchange fluid flowing through the fluid supply channel on the basis of a sensed temperature by the temperature sensor.

* * * * *